(12) United States Patent
Ellingsrud et al.

(10) Patent No.: US 7,038,456 B2
(45) Date of Patent: May 2, 2006

(54) METHOD AND APPARATUS FOR DETERMINING THE NATURE OF SUBTERRANEAN RESERVOIRS

(75) Inventors: Svein Ellingsrud, Trondheim (NO); Terje Eidesmo, Ranheim (NO); Tor Schaug-Pettersen, Trondheim (NO)

(73) Assignee: Electromagnetic Geoservices AS, Trondheim (NO)

( * ) Notice: Subject to any disclaimer, the term of this patent is extended or adjusted under 35 U.S.C. 154(b) by 247 days.

(21) Appl. No.: 10/344,585

(22) PCT Filed: Aug. 2, 2001

(86) PCT No.: PCT/GB01/03473

§ 371 (c)(1),
(2), (4) Date: Aug. 21, 2003

(87) PCT Pub. No.: WO02/14906

PCT Pub. Date: Feb. 21, 2002

(65) Prior Publication Data

US 2004/0027130 A1    Feb. 12, 2004

(30) Foreign Application Priority Data

Aug. 14, 2000  (GB) .................................. 0019956
Sep. 29, 2000  (GB) .................................. 0023921

(51) Int. Cl.
*G01V 3/12*    (2006.01)

(52) U.S. Cl. ...................... 324/334; 324/337

(58) Field of Classification Search ............... 324/332, 324/334–339, 344, 347, 358, 359, 363, 364; 343/703; 702/2, 7, 13
See application file for complete search history.

(56) References Cited

U.S. PATENT DOCUMENTS

| 2,077,707 A | 4/1937 | Melton |
| 4,047,098 A | 9/1977 | Duroux |
| 4,258,321 A | 3/1981 | Neale, Jr. |
| 4,492,924 A * | 1/1985 | Nilsson ...................... 324/330 |
| 4,617,518 A | 10/1986 | Srnka |
| 5,400,030 A | 3/1995 | Duren |
| 6,859,038 B1 * | 2/2005 | Ellingsrud et al. .......... 324/334 |

FOREIGN PATENT DOCUMENTS

| WO | 00/54075 | 9/2000 |
| WO | 01/57555 | 8/2001 |

OTHER PUBLICATIONS

Search Report—PCT/GB01/03473.
Preliminary Examination Report—PCT/GB01/03473.

* cited by examiner

*Primary Examiner*—Bot Ledynh
*Assistant Examiner*—Reena Aurora
(74) *Attorney, Agent, or Firm*—Patterson, Thuente, Skaar & Christensen, P.A.

(57) ABSTRACT

A system for detecting or determining the nature of a subterranean reservoir. An electromagnetic field is applied using a dipole antenna transmitter and this is detected using a dipole antenna receiver. The measurements are taken with the antenna both in-line and parallel and the difference between the two sets of measurements is exploited. A characteristic difference indicates a high resistive layer, which corresponds to a hydrocarbon reservoir.

48 Claims, 6 Drawing Sheets

METHOD AND APPARATUS FOR DETERMINING THE NATURE OF SUBTERRANEAN RESERVOIRS

TECHNICAL FIELD

The present invention relates to a method and apparatus for determining the nature of submarine and subterranean reservoirs. The invention is particularly suitable for determining whether a reservoir, whose approximate geometry and location are known, contains hydrocarbons or water, though it can also be applied to detecting reservoirs with particular characteristics.

BACKGROUND ART

Currently, the most widely used techniques for geological surveying, particularly in submarine situations, are seismic methods. These seismic techniques are capable of revealing the structure of the subterranean strata with some accuracy. However, whereas a seismic survey can reveal the location and shape of a potential reservoir, it cannot reveal the nature of the reservoir.

The solution therefore is to drill a borehole into the reservoir. However, the costs involved in drilling an exploration well tend to be in the region of $40M and since the success rate is generally about 1 in 10, this tends to be a very costly exercise.

It is therefore an object of the invention to provide a system for determining, with greater certainty, the nature of a subterranean reservoir without the need to sink a borehole.

It has been appreciated by the present applicants that while the seismic properties of oil-filled strata and water-filled strata do not differ significantly, their electromagnetic resistivities (permittivities) do differ. Thus, by using an electromagnetic surveying method, these differences can be exploited and the success rate in predicting the nature of a reservoir can be increased significantly. This represents potentially an enormous cost saving. These principles are discussed in International patent application PCT/GB01/00419 (U.S. patent application Ser. No. 10/123,867), which applications are incorporated herein by reference. The method disclosed in the references referred to immediately above determines the nature of a subterranean reservoir whose approximate geometry and location are known, by applying a time varying electromagnetic field to the strata containing the reservoir; detecting the electromagnetic wave field response; seeking in the wave field response, a component representing a refracted wave from the hydrocarbon layer; and determining the content of the reservoir, based on the presence or absence of a wave component refracted by the hydrocarbon layer. The cited references also contemplate a method for searching for a hydrocarbon containing subterranean reservoir which comprises: applying a time varying electromagnetic field to subterranean strata; detecting the electromagnetic wave field response; seeking, in the wave field response, a component representing a refracted wave; and determining the presence and/or nature of any reservoir identified based on the presence or absence of a wave component refracted by hydrocarbon layer. The cited references also contemplate an apparatus for determining the nature of a subterranean reservoir whose approximate geometry and location are known, or for searching for a hydrocarbon containing subterranean reservoir, the apparatus comprising: means for applying a time varying electromagnetic field to the strata containing the reservoir; means for detecting the electromagnetic wave field response; and means for seeking, in the wave field response, a component representing a refracted wave, thereby enabling the presence and/or nature of a reservoir to be determined.

A refracted wave behaves differently, depending on the nature of the stratum in which it is propagated. In particular, the propagation losses in hydrocarbon stratum are much lower than in a water-bearing stratum while the speed of propagation is much higher. Thus, when an oil-bearing reservoir is present, and an EM field is applied, a strong and rapidly propagated refracted wave can be detected. This may therefore indicate the presence of the reservoir or its nature if its presence is already known.

Electromagnetic surveying techniques in themselves are known. However, they are not widely used in practice. In general, the reservoirs of interest are about 1 km or more below the seabed. In order to carry out electromagnetic surveying as a stand alone technique in these conditions, with any reasonable degree of resolution, short wavelengths are necessary. Unfortunately, such short wavelengths suffer from very high attenuation. Long wavelengths do not provide adequate resolution. For these reasons, seismic techniques are preferred.

However, while longer wavelengths applied by electromagnetic techniques cannot provide sufficient information to provide an accurate indication of the boundaries of the various strata, if the geological structure is already known, they can be used to determine the nature of a particular identified formation, if the possibilities for the nature of that formation have significantly differing electromagnetic characteristics. The resolution is not particularly important and so longer wavelengths which do not suffer from excessive attenuation can be employed.

The resistivity of seawater is about 0.3 ohm-m and that of the overburden beneath the seabed would typically be from 0.3 to 4 ohm-m, for example about 2 ohm-m. However, the resistivity of an oil reservoir is likely to be about 20–300 ohm-m. This large difference can be exploited using the techniques of the present invention.

Typically, the resistivity of a hydrocarbon-bearing formation will be 20 to 300 times greater than water-bearing formation.

Due to the different electromagnetic properties of a gas/oil bearing formation and a water bearing formation, one can expect a reflection and refraction of the transmitted field at the boundary of a gas/oil bearing formation. However, the similarity between the properties of the overburden and a reservoir containing water means that no reflection or refraction is likely to occur.

SUMMARY OF THE INVENTION

An electric dipole transmitter antenna on or close to the sea floor induces electromagnetic (EM) fields and currents in the sea water and in the subsurface strata. In the sea water, the EM-fields are strongly attenuated due to the high conductivity in the saline environment, whereas the subsurface strata with less conductivity potentially can act as a guide for the EM-fields (less attenuation). If the frequency is low enough (in the order of 1 Hz), the EM-waves are able to penetrate deep into the subsurface, and deeply buried geological layers having higher electrical resistivity than the overburden (as e.g. a hydrocarbon filled reservoir) will affect the EM-waves. Depending on the angle of incidence and state of polarization, an EM wave incident upon a high resistive layer may excite a ducted (guided) wave mode in the layer. The ducted mode is propagated laterally along the layer and leaks energy back to the overburden and receivers positioned on the sea floor. The term "refracted" wave in this specification is intended to refer to this wave mode.

Both theory and laboratory experiments show that the ducted mode is excited only for an incident wave with transverse magnetic (TM) polarization (magnetic field perpendicular to the plane of incidence) and at angles of incidence close to the Brewster angle and the critical angle (the angle of total reflection). For transverse electric (TE) polarization (electric field perpendicular to the plane of incidence) the ducted mode will not be excited. Since the induced current is proportional to the electric field, the current will be parallel to the layer interfaces for TE polarization but, for TM polarization, there is an appreciable current across the layer interfaces.

A horizontal dipole source on the sea floor will generate both TE and TM waves, but by varying the orientation of the receiver antennae, it is possible to vary the sensitivity to the two modes of polarisation. It appears that an in-line orientation (source and receiver dipoles in-line) is more sensitive to the TM mode of polarisation, whereas a parallel orientation (source and receiver dipoles in parallel) is more sensitive to the TE mode of polarisation. The TM mode is influenced by the presence of buried high resistive layers, whereas the TE mode is not. By measuring with the two antenna configurations and exploiting the difference between the two sets of measurements, it is possible to identify deeply buried high resistivity zones, i.e. a hydrocarbon reservoir

Figure 1:
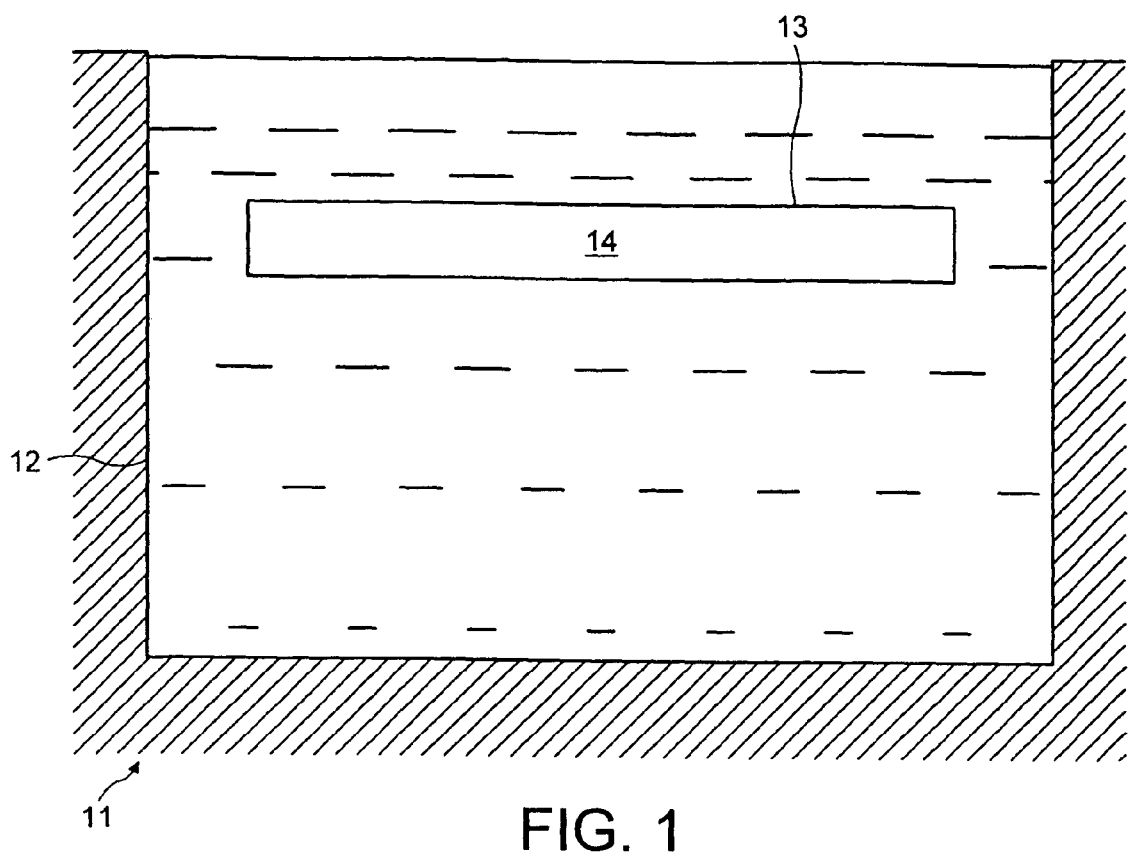
FIG. 1 is a vertical cross-section through a testing tank.

The present invention has arisen from this realisation.

DETAILED DESCRIPTION OF THE INVENTION

According to one aspect of the present invention, there is provided, a method of determining the nature of a subterranean reservoir which comprises: deploying an electric dipole transmitter antenna with its axis generally horizontal; deploying an electric dipole receiver antenna in-line with the transmitter; applying an electromagnetic (EM) field to the strata containing the reservoir using the transmitter; detecting the EM wave field response using the receiver and identifying in the response a component representing a refracted wave from the reservoir according to a first mode; deploying an electric dipole receiver antenna parallel to the transmitter; applying an EM field to the strata using the transmitter; detecting the EM wave field response using the receiver and identifying in the response a component representing a refracted wave from the reservoir according to a second mode; and comparing the first mode refractive wave response with the second mode refracted wave response in order to determine the nature of the reservoir.

According to another aspect of the present invention there is provided, a method of searching for a hydrocarbon-containing subterranean reservoir which comprises: deploying an electric dipole transmitter antenna with its axis generally horizontal; deploying an electric dipole receiver antenna in-line with the transmitter; applying an EM field to subterranean strata using the transmitter; detecting the EM wave field response using the receiver; seeking in the response a component representing a refracted wave according to a first mode, caused by a high-resistivity zone; deploying an electric dipole receiver antenna parallel to the transmitter; applying an EM field to the strata using the transmitter; detecting the EM wave field response using the receiver; seeking in the response a component representing a refracted wave according to a second mode; and comparing the first mode refractive wave response with the second mode refractive wave response in order to determine the presence and/or nature of any high-resistivity zone.

The first mode may be considered to be a TM mode, and the second mode a TE mode.

Thus, according to the invention, measurements are taken with the transmitter and receiver both in-line and parallel, and the two sets of measurements are compared. A characteristic difference in values indicates a highly resistive layer located beneath highly conductive strata. High resistivity indicates the presence of hydrocarbons and so the difference in values is a direct hydrocarbon indicator.

This technique can be used in conjunction with conventional seismic techniques to identify hydrocarbon reservoirs.

Preferably, the transmitter and/or receiver comprises an array of dipole antennae.

The technique is applicable in exploring land-based subterranean reservoirs but is especially applicable to submarine, in particular sub-sea, subterranean reservoirs. Preferably the field is applied using one or more transmitters located on the earth's surface, and the detection is carried out by one or more receivers located on the earth's surface. In a preferred application, the transmitter(s) and/or receivers are located on or close to the seabed or the bed of some other area of water.

In a preferred arrangement, the transmitter and receiver antennae are located on a common cable towed behind a vessel. This will result in a fixed offset or a series of fixed offsets where several receivers are employed. Preferably, the transmitter transmits both modes and may therefore comprise two dipoles arranged mutually at right angles. Preferably each receiver comprises two dipoles mutually at right angles. Preferably one transmitter dipole and one receiver dipole are arranged at right angles to the direction of the cable. Alternatively the transmitter and/or receivers may each comprise a single dipole antenna arranged obliquely, eg. at 45° to the direction of the cable. With this arrangement the transmitted field is resolved.

Using this technique, it is possible to achieve comparable results from the two modes as the same signal and offset are used. It will not matter greatly if the transmitter drifts in frequency or amplitude. Furthermore, reservoirs can be detected in real time. Thus, if the results show a difference in the two modes, this will strongly indicate the presence of an H/C bearing reservoir and so a more detailed study can be made at once.

Such a system would generally use a single transmission source and several receivers, typically more than ten. The different offsets would be suitable for detecting reservoirs at different depths.

The receivers can be deployed on a single cable or on a series of parallel cables. There may also be several transmitters.

In practice, the vessel would normally stop and the cable allowed to sink prior to transmission. There would be a transmission at several different frequencies before moving to another location. The technique is particularly suitable for edge detection, and it is a simple matter to select a suitable resolution. However, if the surveying is being carried out in an undetermined area, the resistivity in the top layers should be mapped, for example with MT methods or by inversion after a reflection study.

If the offset between the transmitter and receiver is significantly greater than three times the depth of the reservoir from the seabed (i.e. the thickness of the overburden), it will be appreciated that the attenuation of the refracted wave will often be less than that of direct wave and the reflected wave. The reason for this is the fact that the path of the refracted wave will be effectively distance from the transmitter down to the reservoir i.e. the thickness of the overburden, plus the offset along the reservoir, plus the distance from the reservoir up to the receivers i.e. once again the thickness of the overburden.

The polarization of the source transmission will determine how much energy is transmitted into the oil-bearing layer in the direction of the receiver. A dipole antenna is therefore the selected transmitter. In general, it is preferable to adopt a dipole with a large effective length. The transmitter dipole may therefore be 100 to 1000 meters in length and may be towed in two orthogonal directions. The receiver dipole optimum length is determined by the thickness of the overburden.

The transmitted field may be pulsed, however, a coherent continuous wave with stepped frequencies is preferred. It may be transmitted for a significant period of time, during which the transmitter should preferably be stationary (although it could be moving slowly), and the transmission stable. Thus, the field maybe transmitted for a period of time from 3 seconds to 60 minutes, preferably from 3 to 30 minutes, for example about 20 minutes. The receivers may also be arranged to detect a direct wave and a wave refracted from the reservoir, and the analysis may include extracting phase and amplitude data of the refracted wave from corresponding data from the direct wave. The term "dataset", as used herein, refers to a group of related records that are organized and treated as a unit.

Preferably, the wavelength of the transmission should be in the range $$0.1s \leq \lambda \leq 5s;$$

where $\lambda$ is the wavelength of the transmission through the overburden and s is the distance from the seabed to the reservoir. More preferably $\lambda$ is from about 0.5s to 2s. The transmission frequency may be from 0.01 Hz to 1 kHz, preferably from 1 to 20 Hz, for example 5 Hz.

Preferably, the distance between the transmitter and a receiver should be in the range $$0.5\lambda \leq L < 10\lambda;$$

where $\lambda$ is the wavelength of the transmission through the overburden and L is the distance between the transmitter and the first receiver.

It will be appreciated that the present invention may be used to determine the position, the extent, the nature and the volume of a particular stratum, and may also be used to detect changes in these parameters over a period of time.

The present invention also extends to a method of surveying subterranean measures which comprises; performing a seismic survey to determine the geological structure of a region; and where that survey reveals the presence of a subterranean reservoir, subsequently performing a method as described above.

Figure 2:
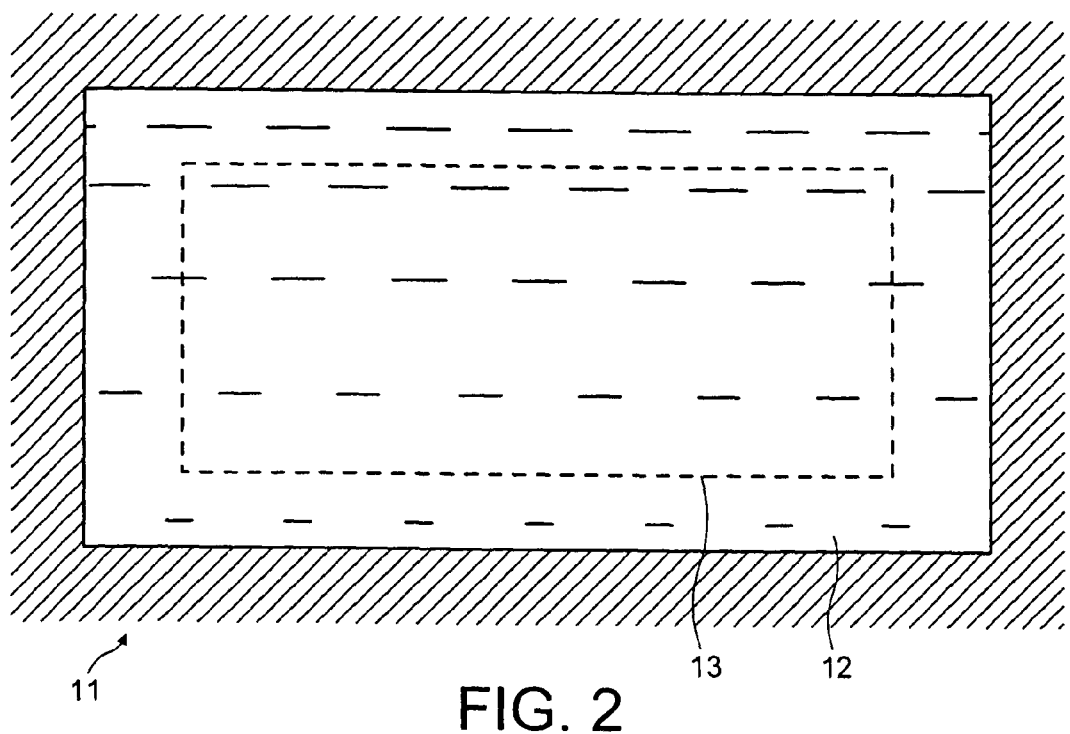
FIG. 2 is a plan view of the tank of FIG. 1.

Referring to the drawings, the tank 11 shown in FIGS. 1 and 2 comprises a concrete enclosure 9 m long, 6 m wide and 8 m in depth. The tank 11 is filled with sea water 12.

The tank 11 shown in FIGS. 1 and 2 comprises a concrete enclosure 9 m long, 6 m wide and 8 m in depth. The tank 11 is filled with sea water 12. A diaphragm 13 filled with fresh water 14 is located in the tank. The diaphragm 13 is 7.5 m long, 4.25 m wide and 0.25 m thick and can be located at any desired height in a horizontal orientation within the tank 11.

The conductivity of the sea water 12 was measured to be 5.3 S/m at 14° C. and the conductivity of the fresh water was measured to be 0.013 S/m. The ratio of the two conductivities is therefore very close to 400.

The critical frequency $f_c$ of a conducting medium, i.e. the frequency at which the displacement current is equal to the conduction current, is given by $$f_c = \frac{\sigma}{2\pi \varepsilon_r \varepsilon_o} \approx 18 \cdot \frac{\sigma}{\varepsilon_r} \text{ GHz}$$

where $\varepsilon_r$ is the relative dielectric constant of the medium, and $\sigma$ the conductivity in S/m. For water, $\varepsilon_r = 80$ at the frequencies and temperatures of interest. For the two conductivity values $\sigma = 5.2$ S/m and $\sigma = 0.013$ S/m, $f_c = 1.2$ GHz and 3 Mhz., respectively. Since, in the experiments, the highest frequency is 0.83 MHz, it is a fair approximation to neglect the displacement current, even for the fresh water.

For a non magnetic, conductive medium, the propagation constant $\gamma$ is given by $$\gamma = j\omega\sqrt{\varepsilon\mu} = j\omega\sqrt{\left(\varepsilon_r\varepsilon_o + \frac{\sigma}{j\omega}\right)\mu_o}$$

$$\approx \sqrt{j\omega\mu_o\sigma} = 2\pi\sqrt{\frac{j \cdot f\sigma}{5}}$$

The wavelength $\lambda$, defined as the distance in which the phase changes $2\pi$, is given by $$\lambda = \frac{2\pi}{\text{Re}\{\gamma\}} \approx \sqrt{\frac{10}{f\sigma}}$$

$\lambda$ m, f in MHz and $\sigma$ in S/m. The skin depth, the distance in which the amplitude diminishes by 1/e, is related to the wavelength by $$\delta = \frac{\lambda}{2\pi}\sqrt{\frac{\pi}{2f\mu_o\sigma}}$$

For the extremes of the frequency range, for the sea water with $\sigma=5.2$ S/m,

| Frequency  | 30 kHz  | 830 kHz |
|------------|---------|---------|
| Skin depth | 1.27 m  | 0.24 m  |
| Wavelength | 8.01 m  | 1.52 m  | and for the fresh water with $\sigma=0.013$ S/m,

| Frequency  | 30 kHz   | 830 kHz |
|------------|----------|---------|
| Skin depth | 25.4 m   | 4.8 m   |
| Wavelength | 160.2 m  | 30.4 m  |

Figure 3:
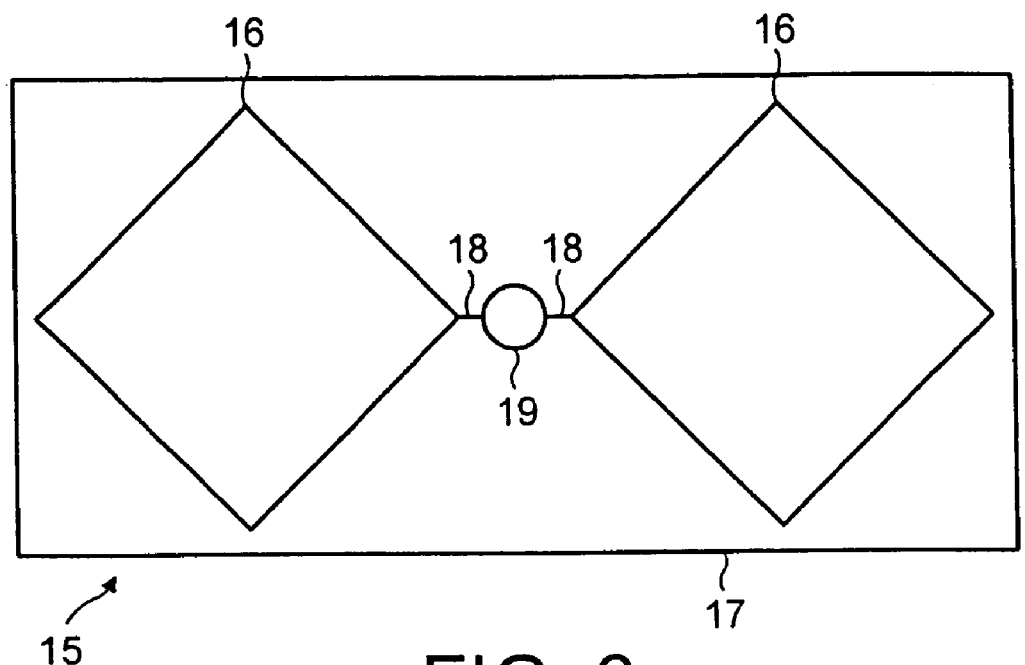
FIG. 3 is a plan view of the antennae used in the tank of FIG. 1.
Figure 4:
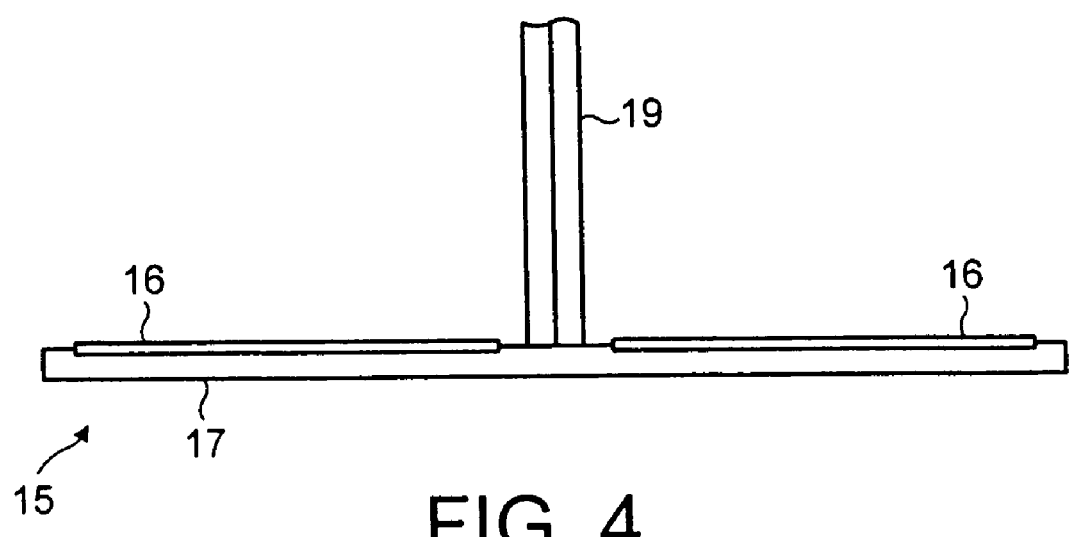
FIG. 4 is a side view of the antenna in FIG. 3.

Referring now to FIGS. 3 and 4, two identical electrical dipole antennae, as shown were used for the transmitter and receiver.

Each antenna 15 comprises two square brass plates 16, 15 cm square, mounted on an epoxy substrate 17. Each plate 16 is connected to a co-axial cable 18, which passes through an epoxy tube 19 mounted at right angles to the plate 16, to a balun which transforms the impedance of the antenna 15 from about 2 Ω in sea water to about 50 Ω.

Figure 5:
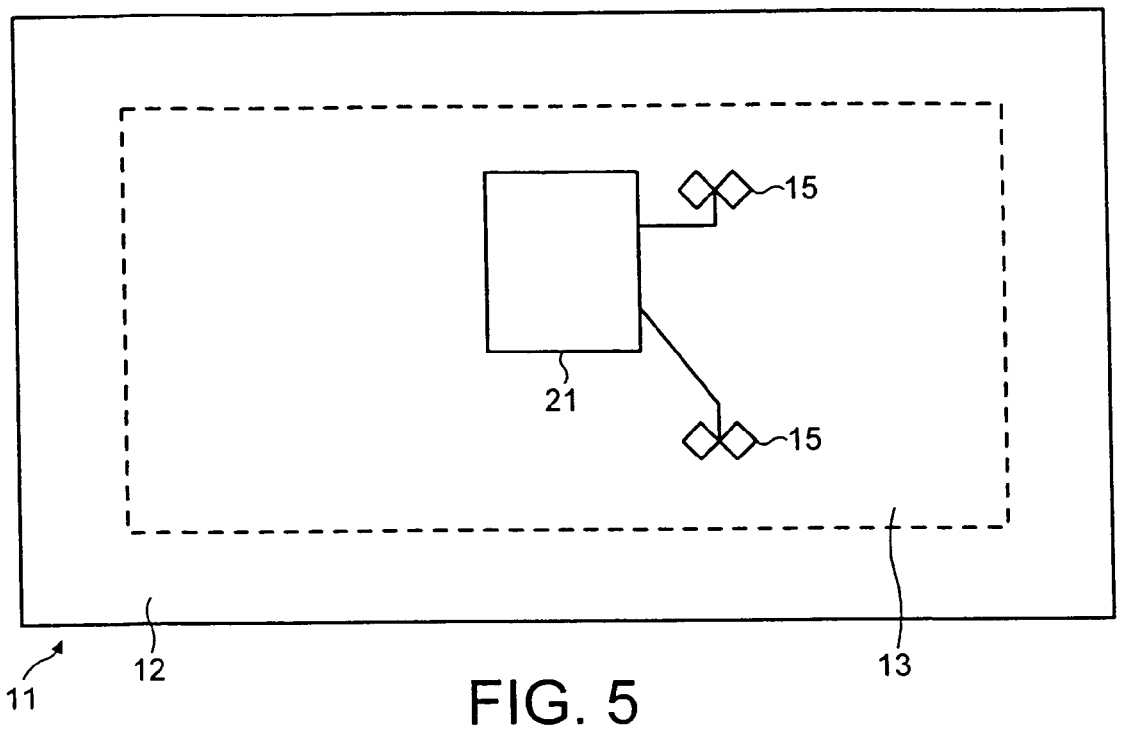
FIGS. 5 and 6 are respectively a schematic plan view and side view of the testing tank set up for measurement.
Figure 6:
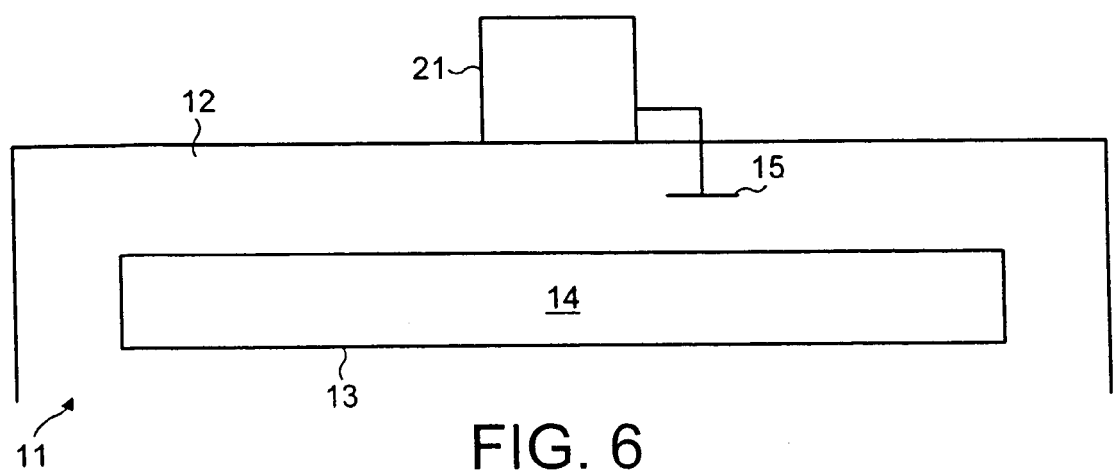

The measurement set-up is shown in FIGS. 5 and 6. An automatic network analyser (ANA) measures the transmission between the antennae 15 as a function of distance (offset) and frequency. The arrangement shown in FIG. 5 shows the antennae 15 in the parallel orientation. The in-line orientation is achieved by rotating both antennae through 90° in the horizontal plane.

Figure 7:
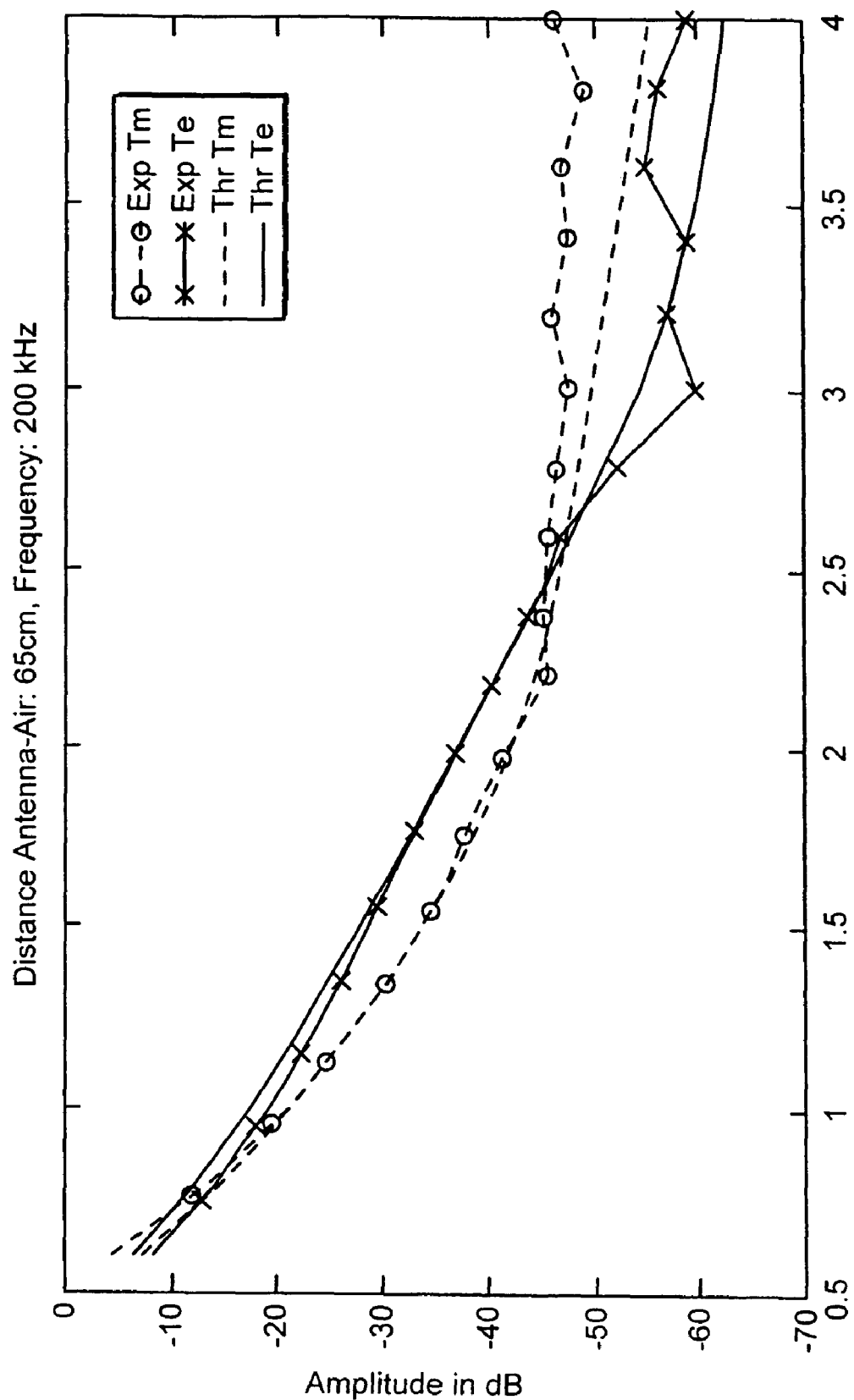
FIG. 7 is a graph showing calculated and measured values for the transmitted electric field for a given frequency in the model experiment.

The results of the measurements are shown in FIG. 7 together with the corresponding theoretical results. The measurements agree well with the theoretical results and the figure contains two sets of curves, one with parallel antennae and one with the antennae in line. The theoretical results are computed for infinitesimal dipole antennae. The orientations of the antennae and the frequency are shown on the FIGS.

The parameters of the experiment are scaled relative to possible practical situations. To give an idea of orders of magnitude; if the frequency is scaled down by a factor of 40,000 and the conductivity by a factor of 10, the dimensions will be scaled up by a factor of 632, and the experimental setup would correspond to a low conductivity layer of thickness 150 m and conductivity 0.0013 S/m below an overburden of thickness 300 m and conductivity 0.52 S/m. The corresponding frequency range would be from 0.75 Hz to 20 Hz, and the length of the antenna nearly 300 m.

Figure 8:
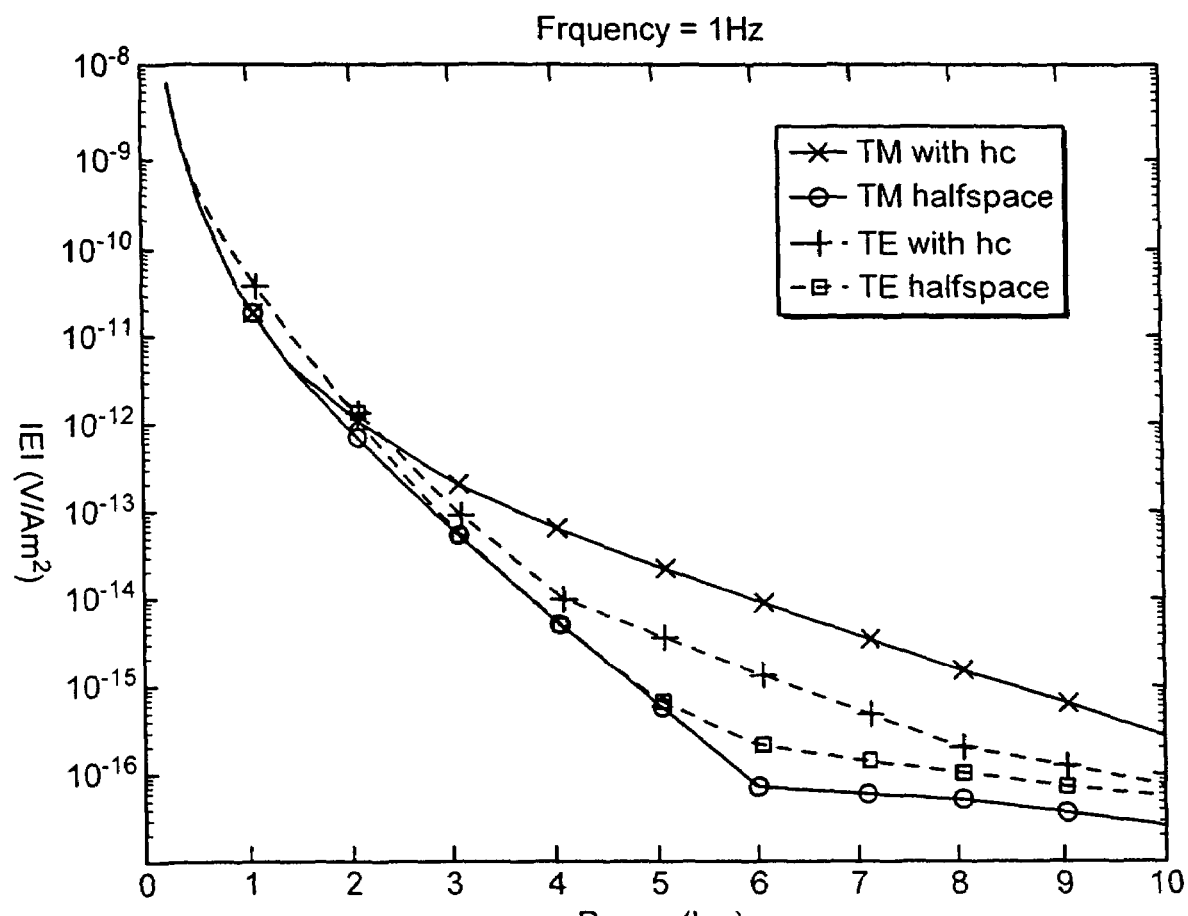
FIG. 8 is a graph showing calculated values for the electric field in a realistic earth model.

The method with the TE and TM-mode have been tested by computer simulations on a simple horizontally layered earth model with electrical parameter values for typical deep water subsurface sediments. The model has an infinite insulating air layer, a 1150 meter water layer of 0.3125 Ωm. 950 meter overburden of 1 Ωm, a 150 meter reservoir zone of 50 Ωm and an infinite underburden of 1 Ωm. FIG. 8 illustrates the amplitude response |E| (electric field) as a function of receiver offset, caused by a 1 Hz signal. Responses from both the TM-mode (solid with x's) and TE-mode (dashed with +'s) are shown. The amplitudes for the TM-mode are approximately 10 times larger at an offset of 5 km. As a reference, the response from a homogenous half-space of 1 Ωm is shown for both configurations (corresponding to a response from a water filler reservoir or outside the reservoir area). The TE-mode has the largest deviation from its half-space, ie. this mode is more sensitive to a hydrocarbon layer.

Figure 9:
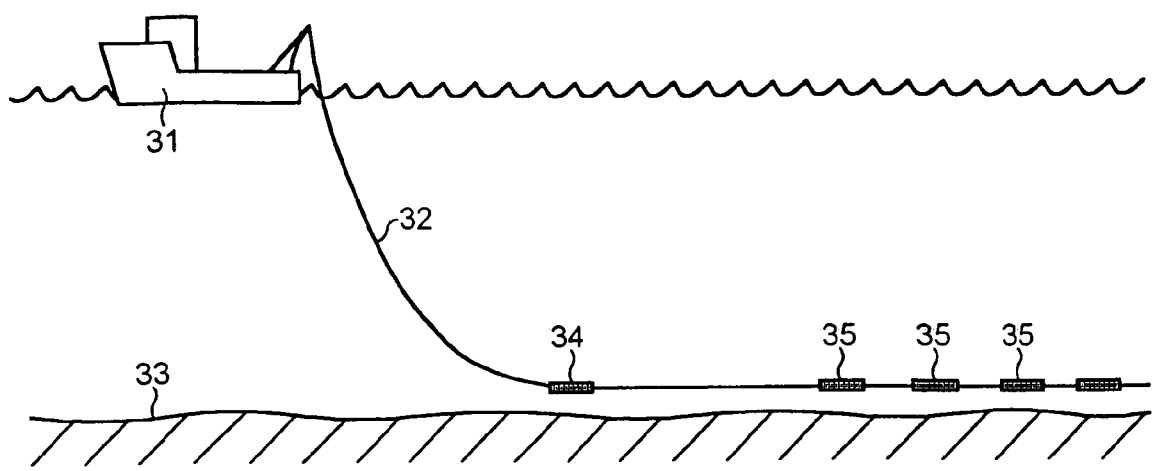
FIG. 9 is a schematic side view of a cable layout towed by a vessel.
Figure 10:
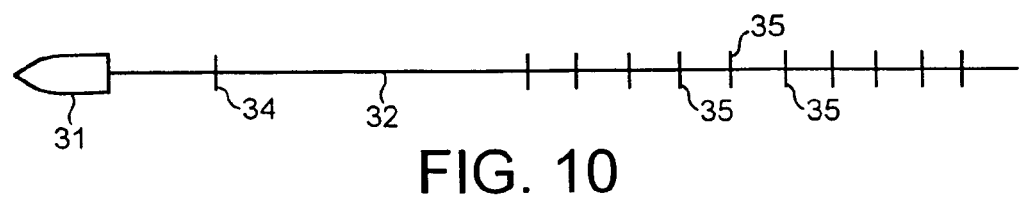
FIG. 10 is a plan view corresponding to FIG. 9.

FIGS. 9 and 10 show a vessel 31 towing a cable (or streamer) 32 just above the seabed 33. The cable 32 carries a transmitter dipole antenna 34 and several receiver dipoles 35, only four of which are shown. The depth of water might be of the order of 1000 m, the offset between the transmitter 34 and the nearest receiver 35 might be about 2000 m and the receivers might be about 100 m apart. The transmitter 34 is controlled from the vessel 31 via the cable 32 and the responses detected by the receivers 35 are relayed back to the vessel 31 in real time, again via the cable 32.

Figure 11:
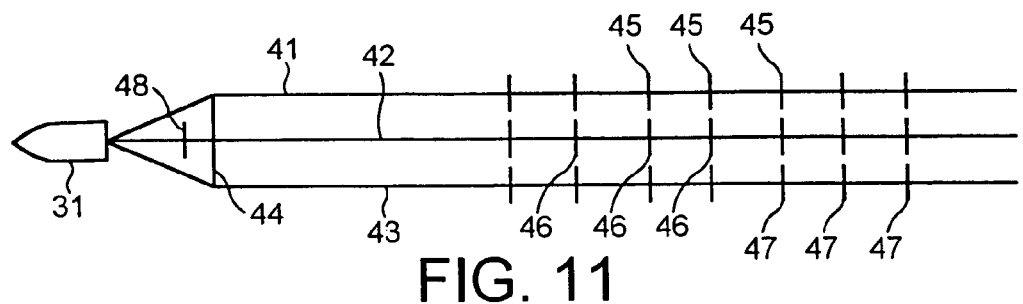
FIGS. 11 and 12 are views similar to FIG. 10 showing two alternative arrangements.

FIG. 11 shows an arrangement in which the vessel 31 tows three cables 41, 42, 43, each carrying a series of receivers 45, 46, 47. The spacing of the three cables 41, 42, 43 is achieved by means of a spar 44.

In the arrangement shown in FIG. 11, the transmitter 48 is in the form of two dipole antennae one parallel to the cable 42 and one at right angles.

Figure 12:
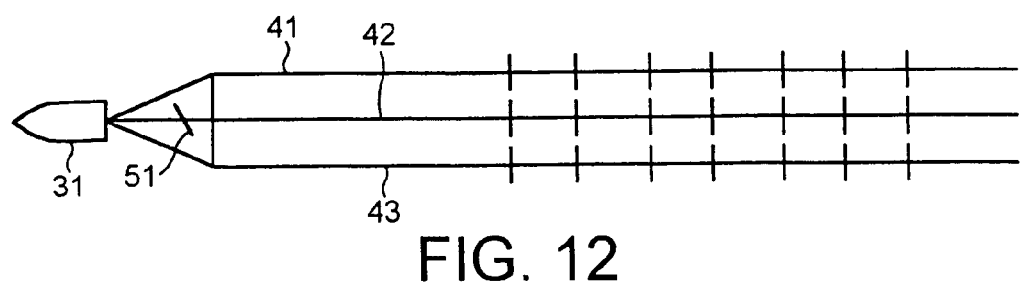

The arrangement shown in FIG. 12 is similar to FIG. 11, but in this case, the transmitter 51 is a single dipole antenna arranged at 45° to the cable 42.

The invention claimed is:

1. A method of determining the nature of a subterranean reservoir which comprises: deploying an electric dipole transmitter antenna; deploying an electric dipole receiver antenna in-line with the transmitter, applying an electromagnetic (EM) field to the strata containing the reservoir using the transmitter; detecting the EM wave field response using the receiver antenna in-line with the transmitter and identifying in the response a component representing a refracted wave from the reservoir according to a first mode; deploying an electric dipole receiver antenna parallel to the transmitter; applying an EM field to the strata using the transmitter; detecting the EM wave field response using the receiver antenna parallel to the transmitter and identifying in the response a component representing a refracted wave from the reservoir according to a second mode; and comparing the first mode refractive wave response with the second mode refracted wave response in order to determine the nature of the reservoir.

2. A method as claimed in claim 1, characterized in that the first mode is a TM mode of polarization and/or the second mode is a TE mode of polarization.

3. A method as claimed in claim 1, characterized in that the transmitter and/or at least one of the receivers comprises an array of dipole antennae.

4. A method as claimed in claim 1, characterized in that the transmitter and/or at least one of the receivers is located on or close to the seabed or the bed of some other area of water.

5. A method as claimed in claim 1, characterized in that the transmitter and at least one of the receivers are located on a common cable arranged to be towed behind a vessel.

6. A method as claimed in claim 5 characterized in that the transmitter and/or at least one of the receivers each comprise a single dipole antenna arranged obliquely to the direction of the cable.

7. A method as claimed in claim 1, characterized in that the transmitter comprises two dipole antennae arranged mutually at right angles.

8. A method as claimed in claim 1, characterized in that at least one of the receivers comprises two dipole antennae arranged mutually at right angles.

9. A method as claimed in claim 1, characterized in that the frequency of the EM field is continuously varied over the transmission period.

10. A method as claimed in claim 9, characterized in that the transmission frequency is from 0.01 Hz to 1 kHz.

11. A method as claimed in claim 10, characterized in that the transmission frequency is from 1 to 20 Hz.

12. A method as claimed in claim 1, characterized in that the field is transmitted for a period of time for 3 seconds to 60 minutes.

13. A method as claimed in claim 12, characterized in that the transmission time is from 3 to 30 minutes.

14. A method as claimed in claim 1, characterized in that the wavelength of the transmission is given by the formula $$0.1s \leq \lambda \leq 10s;$$

wherein $\lambda$ is the wavelength of the transmission through the overburden and s is the distance from the seabed to the reservoir.

15. A method as claimed in claim 1, characterized in that distance between the transmitter and a receiver is given by the formula $$0.5 \leq \lambda \leq 10s;$$

where $\lambda$ is the wavelength of the transmission through the overburden and 1 is the distance between the transmitter and the receiver.

16. A method as claimed in claim 1, characterized in that it includes suppressing the direct wave and/or any other known wave contribution that may disturb the measurements, thereby reducing the required dynamic range of the receiver and increasing the resolution of the refracted wave.

17. A method as claimed in claim 1 including the step of initially performing a seismic survey, to determine whether that survey reveals the presence of a subterranean reservoir and subsequently performing the remaining steps of the recited method to identify the nature of the subterranean reservoir identified by the seismic survey.

18. The method of claim 1, further comprising preparing a graph depicting results from detecting the EM wave field response using at least one of the receivers.

19. The method of claim 18 wherein the at least one of the receivers is in-line to the transmitter or parallel to the transmitter.

20. The method of claim 18 wherein the graph depicts at least one of a transmitter-receiver offset and an amplitude of the detected EM field response.

21. The method of claim 18 wherein the graph depicts a response from TM mode and a response from TE mode.

22. A dataset generated by the method of claim 1, wherein the dataset comprises the component representing a refracted wave from the reservoir.

23. The dataset of claim 22, wherein the component comprises phase data, amplitude data, or both phase data and amplitude data of the refracted wave from the reservoir.

24. The dataset of claim 26, wherein the phase data, the amplitude data, or both the phase data and the amplitude data are depicted in a graph.

25. The dataset of claim 24 wherein the graph comprises at least one of a transmitter-receiver offset and an amplitude of the detected EM field response.

26. The dataset of claim 24 wherein the graph comprises a response from TM mode and a response from TE mode.

27. The dataset of claim 22, wherein the data is generated with the receiver antenna being in-line wit the transmitter.

28. The dataset of claim 22, wherein the data is generated with the receiver antenna being parallel to the transmitter.

29. A method of searching for a hydrocarbon-containing subterranean reservoir which comprises: deploying an electric dipole transmitter antenna; deploying an electric dipole receiver antenna in-line with the transmitter applying an EM field to subterranean strata using the transmitter; detecting the EM wave field response using the receiver in-line with the transmitter; seeking in the response a component representing a refracted wave according to a first mode, caused by a high-resistivity zone; deploying an electric dipole receiver antenna parallel to the transmitter; applying an EM field to the strata using the transmitter, detecting the EM wave field response using the receiver parallel to the transmitter; seeking in the response a component representing a refracted wave according to a second mode; and comparing the first mode refractive wave response with the second mode refractive wave response in order to determine the presence and/or nature of any high-resistivity zone.

30. A method as claimed in claim 29, characterized in that the first mode is a TM mode of polarization and/or the second mode is a TE mode of polarization.

31. A method as claimed in claim 29, characterized in that the transmitter and/or receiver comprises an array of dipole antennae.

32. A method as claimed in claim 29, characterized in that the transmitter and/or receiver is located on or close to the seabed or the bed of some other area of water.

33. A method as claimed in claim 29, characterized in that the transmitter and receivers are located on a common cable arranged to be towed behind a vessel.

34. A method as claimed in claim 33 characterized in that the transmitter and/or receiver each comprise a single dipole antenna arranged obliquely to the direction of the cable.

35. A method as claimed in claim 29, characterized in that the transmitter comprises two dipole antennae arranged mutually at right angles.

36. A method as claimed in claim 29, characterized in that each receiver comprises two dipole antennae arranged mutually at right angles.

37. A method as claimed in claim 29, characterized in that the frequency of the EM field is continuously varied over the transmission period.

38. A method as claimed in claim 37, characterized in that the transmission frequency is from 0.01 Hz to 1 kHz.

39. A method us claimed in claim 32, characterized in that the transmission frequency is from 1 to 20 Hz.

40. A method as claimed in claim 29, characterized in that the field is transmitted for a period of time for 3 seconds to 60 minutes.

41. A method as claimed in claim 40, characterized in that the transmission time is from 3 to 30 minutes.

42. A method as claimed in claim 29, characterized in that the wavelength of the transmission is given by the formula $$0.1s \leq \lambda \leq 10s;$$

wherein $\lambda$ is the wavelength of the transmission through the overburden and s is the distance from the seabed to the reservoir.

43. A method as claimed in claim 29, characterized in that distance between the transmitter and a receiver is given by the formula $$0.5 \leq \lambda \leq 10s;$$

where $\lambda$ is the wavelength of the transmission through the overburden and 1 is the distance between the transmitter and the receiver.

44. A method as claimed in claim 29, characterized in that it includes suppressing the direct wave and/or any other known wave contribution that may disturb the measurements, thereby reducing the required dynamic range of the receiver and increasing the resolution of the refracted wave.

45. The method of claim 29, further comprising preparing a graph depicting results from detecting the EM wave field response using at least one of the receivers.

46. The method of claim 45 wherein the at least one receivers is in-line or parallel to the transmitter.

47. The method of claim 45 wherein the graph comprises at least one of a transmitter-receiver offset and an amplitude of the detected EM field response.

48. The method of claim 45 wherein the graph comprises a response from TM mode and a response from TE mode.

* * * * *